United States Patent
Jin

(10) Patent No.: US 11,953,242 B2
(45) Date of Patent: Apr. 9, 2024

(54) AIR CONDITIONER

(71) Applicant: LG ELECTRONICS INC., Seoul (KR)

(72) Inventor: Hongsuk Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 17/162,160

(22) Filed: Jan. 29, 2021

(65) Prior Publication Data

US 2021/0239376 A1 Aug. 5, 2021

(30) Foreign Application Priority Data

Jan. 31, 2020 (KR) .................. 10-2020-0011694

(51) Int. Cl.
*F25B 41/20* (2021.01)
*F25B 13/00* (2006.01)

(52) U.S. Cl.
CPC .............. *F25B 41/20* (2021.01); *F25B 13/00* (2013.01)

(58) Field of Classification Search
CPC ............. F25B 13/00; F24F 3/06; F24F 3/065; F24F 3/08; F24F 3/10; F24F 1/0035; F24F 1/0038; F24F 1/0063; F24F 1/0068; F24F 1/0059; F24F 2203/1056
See application file for complete search history.

(56) References Cited

U.S. PATENT DOCUMENTS

| 2,363,945 | A | * | 11/1944 | Carrier | ................. | F24F 3/10 |
| | | | | | | 165/53 |
| 3,024,008 | A | * | 3/1962 | Blum | ................. | F24F 3/10 |
| | | | | | | 165/220 |
| 2016/0238290 | A1 | * | 8/2016 | Bae | ................. | F25B 41/20 |

FOREIGN PATENT DOCUMENTS

| CN | 205316557 U | * | 6/2016 | |
| JP | 2649384 B2 | * | 9/1997 | ............ F24F 3/1423 |
| JP | 2010107152 A | * | 5/2010 | |
| KR | 10-2011-0120070 A | | 11/2011 | |
| KR | 10-2017-0025540 A | | 3/2017 | |

OTHER PUBLICATIONS

CN-205316557-U English Translation (Year: 2016).*
JP-2010107152-A English Translation (Year: 2010).*
JP-2649384-B2 English Translation (Year: 1997).*

* cited by examiner

*Primary Examiner* — David J Teitelbaum
*Assistant Examiner* — Devon Moore
(74) *Attorney, Agent, or Firm* — Birch, Stewart, Kolasch & Birch, LLP

(57) ABSTRACT

An air conditioner includes an outdoor unit including a compressor for compressing a refrigerant and an outdoor heat exchanger for exchanging heat between the refrigerant and outside air. A ventilation device is connected to the outdoor unit through a liquid refrigerant pipe, a high-pressure refrigerant pipe, and a low-pressure refrigerant pipe. The ventilation device supplies the outside air to an indoor space, and discharges indoor air to the outside. The ventilation device includes a case, a main heat exchanger, a recovery heat exchanger, a refrigerant distributor, and a re-heat heat exchanger. A liquid refrigerant pipe valve is disposed in the liquid refrigerant pipe for controlling an amount of refrigerant.

13 Claims, 8 Drawing Sheets

AIR CONDITIONER

BACKGROUND

1. Technical Field

The present disclosure relates to an air conditioner, and more particularly, to an air conditioner including a ventilation device for heat-exchanging air by using a refrigerant.

2. Description of the Related Art

In the case of an indoor unit that adjusts the temperature of an indoor space by circulating indoor air, only stagnant air in the indoor space is circulated. Therefore, there is a problem in that it is not possible to continuously provide comfortable air to a user.

Therefore, a ventilation device that can continuously introduce fresh outside air into an indoor space, by introducing outside air and discharging indoor air, may be used.

In the case of a ventilation device, the temperature of the air supplied to the indoor may be adjusted through heat exchange between the indoor air discharged to the outside and the outside air supplied to the indoor, or air flowing into the inside may be heated by installing an additional heater.

Korean patent application No. 1020150122092 discloses a ventilation system based on a dedicated outside air system, and discloses supplying air introduced from the outdoors into the indoor through heat exchange between outside air and indoor air. In addition, outside air flows into the indoor space and is dehumidified using a liquid dehumidifying agent. In this structure, since outside air supplied to the indoor cannot be provided at a temperature desired by a user, it is difficult to properly control the temperature of the indoor space.

In addition, Korean patent application No. 10-2010-0039582 discloses supplying the air introduced from the outdoors to the indoor through a separate cooling coil. In the case of controlling the temperature of the flowing air by using a cooling coil that consumes separate power, there is a problem in that energy efficiency is deteriorated as a large amount of power is consumed.

SUMMARY

The present disclosure has been made in view of the above problems, and provides an air conditioner that minimizes power consumption for temperature control of air supplied to the indoor through a system in which refrigerant flows, in a ventilation system that discharges indoor air to the outside and supplies outside air to the indoor.

The present disclosure further provides an air conditioner that maximizes heat exchange efficiency caused by the driving of a compressor, in a ventilation device in which a plurality of separate heat exchangers are disposed.

The present disclosure further provides an air conditioner capable of accomplishing detailed temperature control of air supplied to the indoor, in a ventilation device in which a plurality of separate heat exchangers are disposed.

The present disclosure further provides an air conditioner that supplies the air dehumidified at an appropriate temperature to an indoor space.

In order to achieve the above object, the air conditioner according to the present disclosure includes: an outdoor unit including a compressor for compressing a refrigerant and an outdoor heat exchanger for exchanging heat between the refrigerant and outside air; and a ventilation device which is connected to the outdoor unit through a liquid refrigerant pipe, a high-pressure refrigerant pipe, and a low-pressure refrigerant pipe, supplies the outside air to an indoor space, and discharges indoor air to the outside.

The ventilation device includes: a case in which a supply flow path through which the outside air is introduced into a room and a discharge flow path through which the indoor air is discharged to the outside are formed therein; a main heat exchanger which is disposed in the supply flow path, and exchanges heat between flowing air and refrigerant; a recovery heat exchanger which is disposed in the discharge flow path, and exchanges heat between flowing air and refrigerant; a refrigerant distributor which is connected to the liquid refrigerant pipe, the high-pressure refrigerant pipe, and the low-pressure refrigerant pipe, and supplies the refrigerant introduced from the outdoor unit to each of the main heat exchanger and the recovery heat exchanger, or supplies the refrigerant flowing from each of the main heat exchanger and the recovery heat exchanger to the outdoor unit; and a re-heat heat exchanger which is disposed in the supply flow path, connected to the high-pressure refrigerant pipe, and heats air flowing through the supply flow path, thereby achieving heat exchange of air supplied to the indoors or discharged to the outdoors through the ventilation device.

In addition, a liquid refrigerant pipe valve for controlling an amount of refrigerant, which is discharged from the outdoor unit and flows to the refrigerant distributor, is disposed in the liquid refrigerant pipe, thereby controlling the amount of refrigerant flowing into the high-pressure refrigerant pipe.

The re-heat heat exchanger is disposed downstream of the main heat exchanger in the supply flow path, thereby heating the refrigerant that has passed through the main heat exchanger.

Since the re-heat heat exchanger has a smaller heat exchange area than the main heat exchanger, it is advantageous to control the temperature in a smaller range than the main heat exchanger.

The air conditioner further includes a controller for adjusting a liquid pipe control valve, and the controller adjusts the liquid pipe control valve to increase an amount of refrigerant supplied to the re-heat heat exchanger, during a dehumidifying operation of discharging dry air into an indoor space through the supply flow path, thereby precisely controlling the temperature of air discharged to the room during dehumidifying operation.

The air conditioner further includes: a first branch refrigerant pipe connecting the high-pressure refrigerant pipe and the re-heat heat exchanger; and a first convergence refrigerant pipe connecting the re-heat heat exchanger and the refrigerant distributor so that a high-pressure gaseous refrigerant may be supplied, and the heat-exchanged refrigerant may be supplied to the refrigerant distributor.

The first convergence refrigerant pipe is connected to the liquid pipe to supply the refrigerant discharged from the re-heat heat exchanger to the refrigerant distributor.

The first convergence refrigerant pipe is connected to the liquid pipe in a position adjacent to a liquid refrigerant header and between the liquid refrigerant header and the liquid pipe control valve, and may be connected to the liquid pipe by bypassing the liquid pipe control valve.

The refrigerant distributor includes: a liquid refrigerant header connecting the liquid pipe and each of the main heat exchanger and the recovery heat exchanger disposed inside the case; a high-pressure refrigerant header connecting the high-pressure refrigerant pipe and each of the main heat exchanger and the recovery heat exchanger disposed inside the case; and a low pressure refrigerant header connecting the low pressure refrigerant pipe and each of the main heat exchanger and the recovery heat exchanger disposed inside the case.

The air conditioner further includes a control valve for adjusting an amount of refrigerant supplied from the high-pressure refrigerant pipe to the re-heat heat exchanger, thereby controlling the amount of refrigerant flowing to the re-heat heat exchanger.

The air conditioner further includes a preheat heat exchanger which is disposed in the supply flow path, and connected to the high-pressure refrigerant pipe to heat air flowing through the supply flow path, thereby preheating the air introduced into the supply flow path.

The air conditioner further includes an on/off valve for opening and closing the refrigerant supplied from the high-pressure refrigerant pipe to the preheat heat exchanger, thereby controlling the supply of refrigerant to the preheat heat exchanger.

The air conditioner further includes a controller for adjusting the on-off valve, and the controller controls the on/off valve to stop supply of refrigerant to the preheat heat exchanger, during a dehumidifying operation of discharging dry air to an indoor space through the supply flow path, thereby dehumidifying the air supplied as the indoor air properly.

BRIEF DESCRIPTION OF THE DRAWINGS

The above and other objects, features and advantages of the present disclosure will be more apparent from the following detailed description in conjunction with the accompanying drawings, in which:

FIG. 6A is a diagram illustrating a flow of a refrigerant during a cooling operation, and FIG. 6B is a diagram illustrating a flow of a refrigerant during a heating operation.

DETAILED DESCRIPTION

Figure 1:
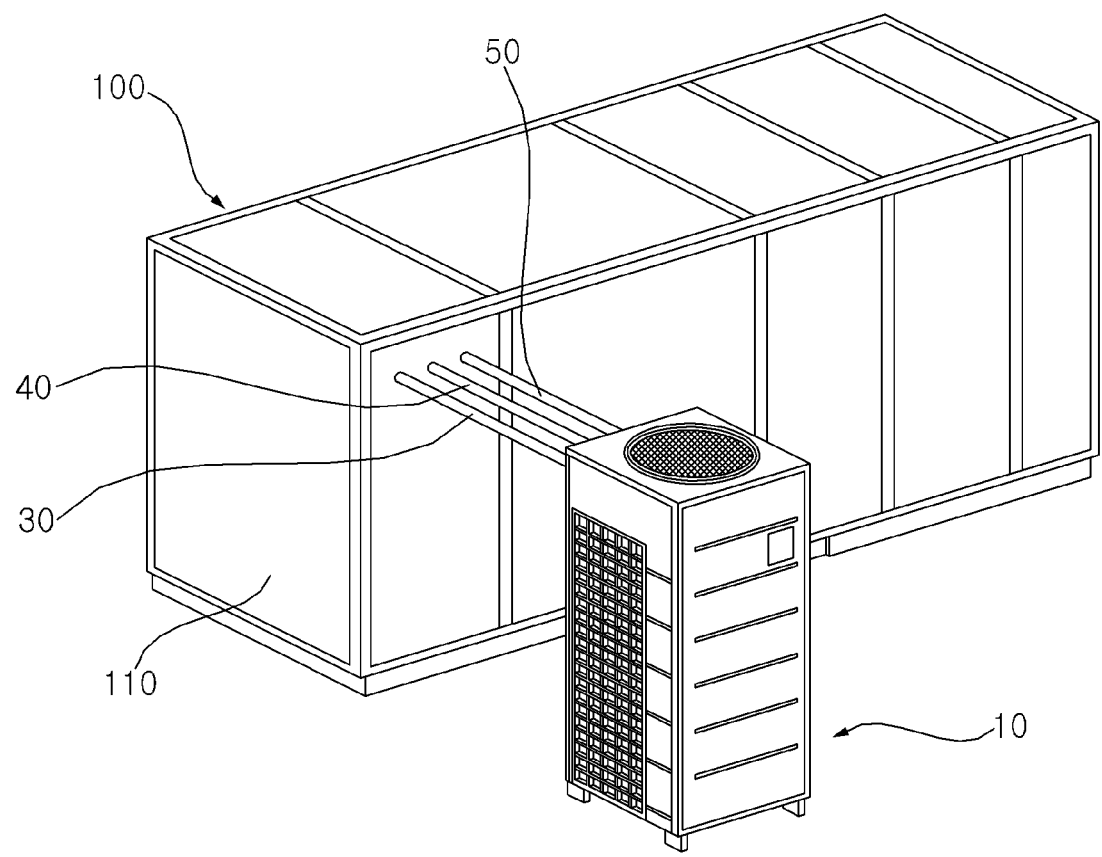
FIG. 1 is a schematic perspective view of an air conditioner including a ventilation device, an outdoor unit, and a plurality of refrigerant pipes according to an embodiment of the present disclosure.

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art. The present disclosure is defined only by the scope of the claims. Like reference numerals refer to like elements throughout the specification.

Hereinafter, the present disclosure will be described with reference to the drawings for explaining an air conditioner according to embodiments of the present disclosure.

Overall Configuration

Hereinafter, an overall configuration of an air conditioner including a ventilation device and an outdoor unit of the present disclosure will be described with reference to FIG. 1.

The air conditioner of the present disclosure includes an outdoor unit 10 including a compressor 12 for compressing a refrigerant and an outdoor heat exchanger 14 for exchanging the refrigerant and outside air, a ventilation device 100 for heat-exchanging indoor air to discharge to the outside and heat-exchanging outside air to supply to the indoor, and a plurality of refrigerant pipes 30, 40, 50 connecting the ventilation device 100 and the outdoor unit 10.

The ventilation device 100 may be a ventilation apparatus that discharges indoor air to an outdoor space and supplies outside air to an indoor space. The ventilation device 100 may heat or cool outside air supplied to the indoor space by disposing a plurality of heat exchangers therein. The ventilation device 100 may exchange heat between outside air and indoor air. The ventilation device 100 may heat-exchange indoor air discharged to the outdoor space and then discharge the indoor air.

The ventilation device 100 includes a refrigerant distributor 150 that transfers refrigerant to each of the plurality of heat exchangers. The ventilation device 100 may supply a liquid refrigerant or a gaseous refrigerant to each of the plurality of heat exchangers disposed therein, through the refrigerant distributor 150. Accordingly, each of the plurality of heat exchangers disposed inside the ventilation device 100 may heat the flowing air and cool the flowing air simultaneously.

The ventilation device 100 may be connected to the outdoor unit 10 through a plurality of refrigerant pipes 30, 40, and 50. The ventilation device 100 may be connected to the outdoor unit 10 through three refrigerant pipes.

The plurality of refrigerant pipes 30, 40, 50 may include a liquid pipe 30 through which a liquid refrigerant flows, a high-pressure refrigerant pipe 40 through which a high-pressure gaseous refrigerant flows, and a low-pressure refrigerant pipe 50 through which a low-pressure gaseous refrigerant flows.

The outdoor unit 10 may compress a refrigerant by a compressor 12 disposed therein, and transfer the compressed refrigerant to the outdoor heat exchanger 14 or to the ventilation device 100.

Ventilation Device

Hereinafter, a ventilation device according to the present disclosure will be described with reference to FIGS. 2 to 5B.

The ventilation device 100 of the present disclosure is installed between an indoor space and an outdoor space, and may allow indoor air to flow outdoors and outside air to flow indoors. The ventilation device 100 of the present disclosure may be a ventilation device that introduces outside air into the indoor and transfers indoor air to the outside.

Figure 2:
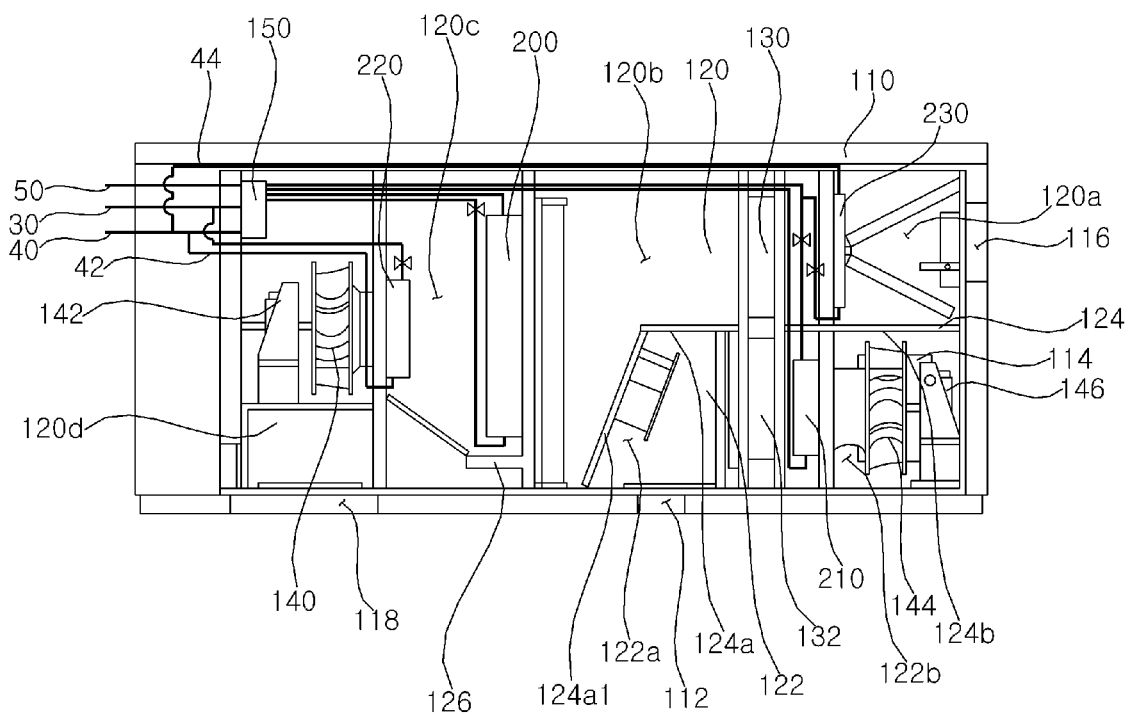
FIG. 2 is a schematic cross-sectional view of a ventilation device according to an embodiment of the present disclosure.
Figure 3:
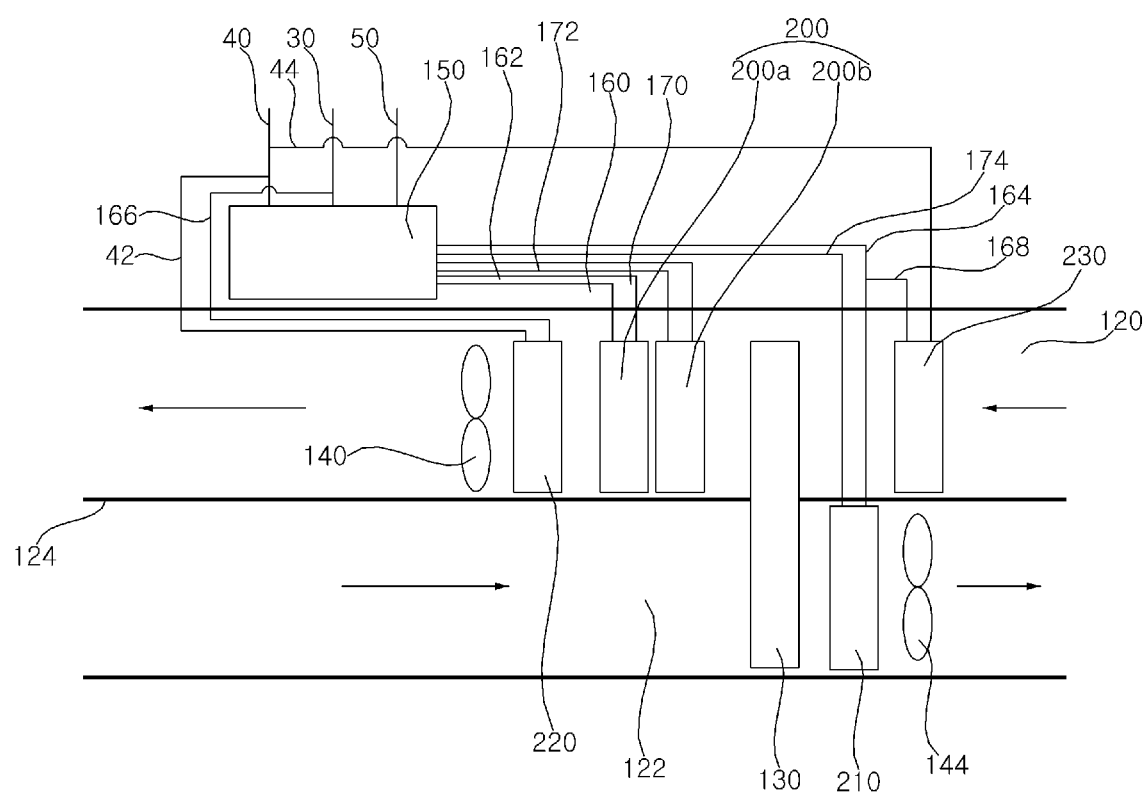
FIG. 3 is a view for explaining the air flowing inside the ventilation device according to an embodiment of the present disclosure.

The ventilation device 100 may be connected to the outdoor unit 10 through a plurality of refrigerant pipes 30, 40, and 50. Referring to FIGS. 1 to 3, the ventilation device 100 includes a liquid pipe 30 through which a liquid refrigerant flows, a high-pressure refrigerant pipe 40 through which a high-pressure gaseous refrigerant flows, and a low-pressure refrigerant pipe 50 through which a low-pressure gaseous refrigerant flows, and is connected to the outdoor unit 10.

The ventilation device 100 of the present disclosure includes a supply flow path 120 through which outside air flows therein, a case 110 forming a discharge flow path 122 through which indoor air flows, a partition wall 124 disposed inside the case 110 and separating the supply flow path 120 and the discharge flow path 122, a total heat exchanger 130 disposed inside the case 110 and heat-exchanging the outside air flowing through the supply flow path 120 with the indoor air flowing through the discharge flow path 122, a plurality of heat exchangers 200a, 200b, 210 disposed in the supply flow path 120 or the discharge flow path 122, and heat-exchanging flowing air with a refrigerant, and a refrigerant distributor 150 disposed inside the case 110 and connecting the plurality of heat exchangers 200a, 200b, 210 and the outdoor unit 10

The ventilation device 100 includes a first blowing fan 140 rotatably disposed in the supply flow path 120, a first blowing motor 142 that rotates the first blowing fan 140, a second blowing fan 144 that is rotatably disposed in the discharge flow path 122, and a second blowing motor 146 that rotates the second blowing fan 144.

A plurality of heat exchangers include a main heat exchanger 200 disposed in the supply flow path 120 to heat-exchange the refrigerant with the flowing outside air, a recovery heat exchanger 210 disposed in the discharge flow path 122 to heat-exchange with the flowing indoor air, and a re-heat heat exchanger 220 disposed in the supply flow path for heat-exchanging the refrigerant with the outside air that passed through the main heat exchanger 200. The plurality of heat exchangers may further include a preheat heat exchanger 230 disposed in the supply flow path 120 to heat air flowing into the supply flow path 120.

The case 110 forms a supply flow path 120 and a discharge flow path 122 therein. The case 110 forms a space in which the refrigerant distributor 150 is disposed. The space in which the refrigerant distributor 150 is disposed may be a space separated from the supply flow path 120 and the discharge flow path 122. In addition, the refrigerant distributor 150 may be disposed in one side of the supply flow path 120 or the discharge flow path 122. The refrigerant distributor 150 may be disposed in a position that does not interfere with the flow of air in one side of the supply flow path 120.

The case 110 includes an outside air intake port 116, through which the inside of the case 110 and the outside communicate with each other, that is formed in one side of the supply flow path 120, and an outside air supply port 118, through which the inside of the case 110 and the interior communicate with each other, that is formed in the other side of the supply flow path 120. The case 110 includes an indoor air discharge port 114, through which the inside of the case 110 and the outside communicate with each other, that is formed in one side of the discharge flow path 122, and an indoor air intake port 112, through which the inside of the case 110 and the interior communicate with each other, that is formed in the other side of the discharge flow path 122.

The outside air intake port 116 and the outside air supply port 118 may be disposed in a vertical direction. The indoor air intake port 112 and the indoor air discharge port 114 may be disposed in a vertical direction.

The supply flow path 120 forms a flow path shorter than the discharge flow path 122. Referring to FIG. 2, the supply flow path 120 may form a vertical flow path in the form of an "¬" shape.

The supply flow path 120 may be separated into a first supply flow path 120a formed between the outside air intake port 116 and the total heat exchanger 130, a second supply flow path 120b formed between the total heat exchanger 130 and the main heat exchanger 200, a third supply flow path 120c formed between the main heat exchanger 200 and the re-heat heat exchanger 220, and a fourth supply flow path 120d formed between the re-heat heat exchanger 220 and the outside air supply port 118.

In the first supply flow path 120a, the preheat heat exchanger 230 for heating air flowing into the outside air intake port 116 is disposed.

In the second supply flow path 120b, the cross-sectional area of the flow path increases as it goes from upstream to downstream in the flow direction of air. The main heat exchanger 200 is disposed in the downstream end of the second supply flow path 120b. The flow velocity of the air flowing through the second supply flow path 120b decreases as it goes downstream, and the flow path expands. Therefore, a large amount of air may be heat-exchanged in the main heat exchanger 200.

A drain pan 126 for temporarily storing condensed water and discharging the condensed water to the outside may be disposed under the main heat exchanger 200.

The third supply flow path 120c has a shape in which the cross-sectional area of the flow path decreases as it goes from upstream to downstream in the flow direction of air. Accordingly, condensed water generated from the air flowing through the third supply flow path 120c may move to the drain pan 126. The air flowing through the third supply flow path 120c may be formed to have a flow speed that becomes faster gradually.

A first blowing fan 140 is disposed in the fourth supply flow path 120d. The fourth supply flow path 120d may form a flow path perpendicular to the third supply flow path 120c. The first blowing fan 140 flows the air that passed through the re-heat heat exchanger 220 to the outside air supply port 118. The first blowing fan 140 may use a cross-flow fan that sucks air in a direction parallel to the rotation axis and discharges air in a direction perpendicular to the rotation axis.

The discharge flow path 122 may include a first discharge flow path 122a formed between the indoor air intake port 112 and the total heat exchanger 130, and a second discharge flow path 122b formed between the total heat exchanger 130 and the indoor air discharge port 114.

The second discharge flow path 122b is disposed below the first supply flow path 120a. The first discharge flow path 122a is disposed below the second supply flow path 120b.

The first discharge flow path 122a forms a flow path perpendicular to the second discharge flow path 122b.

A recovery heat exchanger 210 is disposed in the second discharge flow path 122b.

A second blowing fan 144 is disposed in the second discharge flow path 122b to flow air flowing through the discharge flow path 122 to the indoor air discharge port 114.

A partition wall 124 that separates the supply flow path 120 and the discharge flow path 122 is disposed inside the case 110.

The partition wall 124 includes a first partition wall 124a partitioning between the second supply flow path 120b and the first discharge flow path 122a, and a second partition wall 124*b* partitioning between the first supply flow path 120*a* and the second discharge flow path 122*b*.

The second partition wall 124*b* may have a horizontal plate shape that partitions the first supply flow path 120*a* and the second discharge flow path 122*b*. The first partition wall 124*a* may include an inclined surface 124*a*1 for expanding the cross-sectional area of the second supply flow path 120*b*.

The total heat exchanger 130 is an apparatus for recovering sensible heat and latent heat by using a temperature difference and a humidity difference between outside air and ventilated air while rotating at a low speed. The total heat exchanger 130 is formed in a cylindrical body shape, and the inside is formed in a honeycomb structure to allow air to pass therethrough.

The total heat exchanger 130 may recover sensible heat and latent heat by using a temperature difference and a humidity difference between outside air and ventilated air while rotating a heat exchanger 132 at a low speed. The heat exchanger 132 is formed of aluminum as a base material and may recover sensible heat by the heat transfer characteristics of aluminum. In addition, aluminum is impregnated with a desiccant, and latent heat may be recovered by the principle of absorption of water vapor.

The total heat exchanger 130 is disposed in both the supply flow path 120 and the discharge flow path 122.

Each of the plurality of heat exchangers 200*a*, 200*b*, and 210 is connected to the refrigerant distributor 150 by a plurality of indoor gas pipes 170, 172, and 174 and a plurality of indoor liquid pipes 160, 162, and 164.

In the supply flow path 120, the main heat exchanger 200 is disposed in downstream of the total heat exchanger 130. In the supply flow path 120, the main heat exchanger 200 may be disposed in an enlarged cross-sectional area. The main heat exchanger 200 may exchange heat with air in a larger area than the re-heat heat exchanger 220. The main heat exchanger 200 may be connected to the refrigerant distributor 150 to receive a compressed refrigerant flowing from a high-pressure refrigerant pipe 40 or a liquid refrigerant flowing from a liquid pipe 30.

Figure 4:
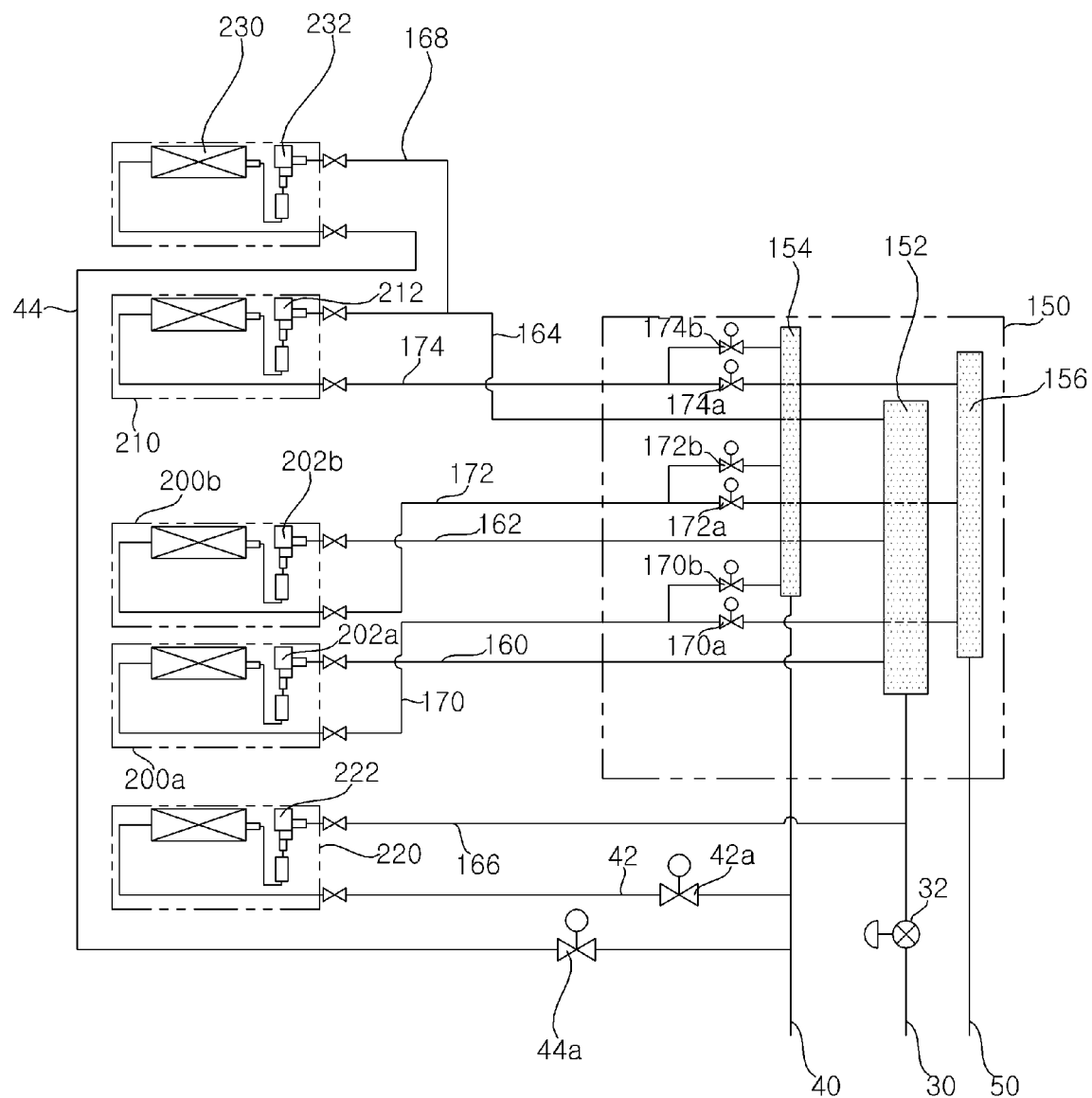
FIG. 4 is a system diagram showing a connection relationship between a heat exchanger and a refrigerant distributor disposed inside a ventilation device according to an embodiment of the present disclosure.

Referring to FIGS. 3 to 4, the main heat exchanger may include a first main heat exchanger 200*a* and a second main heat exchanger 200*b*. The first main heat exchanger 200*a* and the second main heat exchanger 200*b* may be disposed, in the supply flow path 120, in parallel in the flow direction of air. The first main heat exchanger 200*a* and the second main heat exchanger 200*b* may be vertically disposed, in the supply flow path 120, in the flow direction of air. The first main heat exchanger 200*a* may be disposed adjacent to the preheat heat exchanger 230, and in some embodiments may be closer to the preheat exchanger 230 than the second main heat exchanger 200*b*.

The recovery heat exchanger 210 is disposed, in the discharge flow path 122, downstream of the total heat exchanger 130. The recovery heat exchanger 210 heats or cools indoor air flowing to the outdoor space through the discharge flow path 122. The recovery heat exchanger 210 may operate opposite to the main heat exchanger 200. Here, the opposite operation may mean that heat exchanges for heating or cooling air are performed differently. That is, it may mean that when the main heat exchanger 200 cools the air flowing through the supply flow path 120, the recovery heat exchanger 210 heats the air flowing through the discharge flow path 122, and when the main heat exchanger 200 heats air flowing through the supply flow path 120, the recovery heat exchanger 210 cools the air flowing through the discharge flow path 122.

The recovery heat exchanger 210 may be disposed, in the discharge flow path 122, in upstream of the second blowing fan 144.

The re-heat heat exchanger 220 is disposed, in the supply flow path 120, in downstream of the main heat exchanger 200. The re-heat heat exchanger 220 may be disposed in an inlet end of the first blowing fan 140. Accordingly, the re-heat heat exchanger 220 may heat air flowing into the inlet end of the first blowing fan 140. The re-heat heat exchanger 220 may receive the refrigerant discharged from the compressor 12 through a first branch refrigerant pipe 42 branched from the high-pressure refrigerant pipe 40. Referring to FIGS. 2 to 4, the first branch refrigerant pipe 42 according to the present disclosure is branched from the high-pressure refrigerant pipe 40. However, this is just an embodiment, and it is also possible that the first branch refrigerant pipe 42 is connected to a liquid refrigerant header 152 disposed inside the refrigerant distributor 150.

In the first branch refrigerant pipe 42, a control valve 42*a* for controlling the supply of refrigerant to the re-heat heat exchanger 220 may be disposed.

The re-heat heat exchanger 220 supplies the heat-exchanged refrigerant to the liquid pipe 30 described below. The re-heat heat exchanger 220 supplies the refrigerant heat-exchanged through a first convergence refrigerant pipe 166 to the liquid pipe 30. The first convergence refrigerant pipe 166 is connected to the liquid pipe 30 at a position adjacent to the liquid refrigerant header 152 between the liquid refrigerant header 152 and a liquid pipe control valve 32. The first convergence refrigerant pipe 166 supplies the refrigerant heat-exchanged in the re-heat heat exchanger 220 to the refrigerant distributor 150.

The preheat heat exchanger 230 is disposed in the inlet end of the supply flow path 120 in which the outside air intake port 116 is formed. The preheat heat exchanger 230 is disposed, in the supply flow path 120, in upstream of the total heat exchanger 130. The preheat heat exchanger 230 is disposed in the first supply flow path 120*a*. The preheat heat exchanger 230 may receive the refrigerant discharged from the compressor 12 through a second branch refrigerant pipe 44 branched from the high-pressure refrigerant pipe 40. The second branch refrigerant pipe 44 connects the high-pressure refrigerant pipe 40 and the preheat heat exchanger 230 without passing through the refrigerant distributor 150.

The preheat heat exchanger 230 supplies the heat-exchanged refrigerant to a third indoor liquid pipe 164 described below. In the second branch refrigerant pipe 44, an on/off valve 44*a* for opening and closing a flow path formed in a second branch refrigerant pipe 44 is disposed. Accordingly, the refrigerant may be supplied to the preheat heat exchanger 230 or the supply may be stopped by adjusting the on/off valve 44*a*. By adjusting the on-off valve 44*a*, the heating of the air passing through the preheat heat exchanger 230 can be controlled.

The refrigerant distributor 150 is connected to the outdoor unit 10 and connected to each of the plurality of heat exchangers 200*a*, 200*b*, and 210. The refrigerant distributor 150 is connected to the outdoor unit 10 through the liquid pipe 30, the high pressure refrigerant pipe 40, and the low pressure refrigerant pipe 50.

The refrigerant distributor 150 is disposed inside the case 110. The refrigerant distributor 150 is connected to each of a plurality of heat exchangers 200*a*, 200*b*, 210 which are disposed inside the ventilation device 100, through a plurality of indoor gas pipes 170, 172, 174 and a plurality of indoor liquid pipes 160, 162, 164. The plurality of indoor gas pipes 170, 172, 174 may include a first indoor gas pipe 170 connected to the first main heat exchanger 200a, a second indoor gas pipe 172 connected to the second main heat exchanger 200b, and a third indoor gas pipe 173 connected to the recovery heat exchanger 210.

Each of the plurality of indoor gas pipes 170, 172, 174 is branched inside the refrigerant distributor 150 and connected to a high-pressure refrigerant header 154 and a low-pressure refrigerant header 156. Control valves 170a, 170b, 172a, 172b, 174a, 174b for controlling the flow of refrigerant are disposed in each of a plurality of branched indoor gas pipes 170, 172, 174.

The plurality of indoor liquid pipes 160, 162, 164 may include a first indoor liquid pipe 160 connected to the first main heat exchanger 200a, a second indoor liquid pipe 162 connected to the second main heat exchanger 200b, and a third indoor liquid pipe 164 connected to the recovery heat exchanger 210.

Indoor heat exchanger expansion valves 202a, 202b, 212 may be disposed in each of the plurality of indoor liquid pipes 160, 162, 164. Accordingly, the indoor heat exchanger expansion valves 202a, 202b, 212 disposed in each of the plurality of indoor liquid pipes 160, 162, 164 may expand the refrigerant flowing through each of the plurality of indoor liquid pipes 160, 162, 164.

The re-heat heat exchanger 220 is connected to the inner liquid pipe 30 by the first convergence liquid pipe 166. The preheat heat exchanger 230 is connected to the third indoor liquid pipe 164 by the second convergence liquid pipe 168. Expansion valves 222 and 232 for expanding the flowing refrigerant may be disposed in each of the first convergence liquid pipe 166 and the second convergence liquid pipe 168.

The refrigerant distributor 150 is connected to the first main heat exchanger 200a through the first indoor liquid pipe 160 and the first indoor gas pipe 170. The refrigerant distributor 150 is connected to the second main heat exchanger 200b through the second indoor liquid pipe 162 and the second indoor gas pipe 172. The refrigerant distributor 150 is connected to the recovery heat exchanger 210 through the third indoor liquid pipe 164 and the third indoor gas pipe 174.

The refrigerant distributor 150 includes a liquid refrigerant header 152 connecting the liquid pipe 30 and each of the plurality of heat exchangers 200a, 200b, 210, a high-pressure refrigerant header 154 connecting the high-pressure refrigerant pipe 40 and each of the plurality of heat exchangers 200a, 200b, 210, and a low pressure refrigerant header 156 connecting the low pressure refrigerant pipe 50 and each of the plurality of heat exchangers 200a, 200b, 210.

The liquid refrigerant header 152 connects the liquid pipe 30 and each of the plurality of indoor liquid pipes 160, 162, and 164. The high-pressure refrigerant header 154 connects the high-pressure refrigerant pipe 40 and each of the plurality of indoor gas pipes 170, 172, and 174. The low-pressure refrigerant header 156 connects the low-pressure refrigerant pipe 50 and each of the plurality of indoor gas pipes 170, 172, and 174.

In the liquid pipe 30 of the present disclosure, a liquid pipe control valve 32 for adjusting the amount of refrigerant flowing to the refrigerant distributor 150 is disposed. The liquid pipe control valve 32 may adjust the amount of refrigerant flowing to the re-heat heat exchanger, by adjusting the amount of refrigerant flowing to the liquid pipe.

That is, when increasing the amount of refrigerant flowing to the re-heat heat exchanger, the liquid pipe control valve 32 may be adjusted to reduce the amount of refrigerant flowing to the liquid pipe 30.

Outdoor Unit

Hereinafter, the configuration of the outdoor unit of the present disclosure will be described with reference to FIGS. 6A to 6B.

The outdoor unit 10 includes a compressor 12 for compressing a refrigerant, an outdoor heat exchanger 14 which is disposed inside the outdoor unit 10 and exchanges heat between a refrigerant and an outside air, a first switching valve 18 that transfers the refrigerant discharged from the compressor 12 to the ventilation device 100 or transfers the refrigerant supplied from the ventilation device 100 to the compressor 12, and a second switching valve 20 that transfers the refrigerant discharged from the compressor 12 to the outdoor heat exchanger 14 or transfers the refrigerant introduced from the outdoor heat exchanger 14 to the compressor 12.

A compressor discharge pipe through which the refrigerant discharged from the compressor 12 flows is branched and connected to each of the first switching valve 18 and the second switching valve 20.

The first switching valve 18 is connected to the compressor 12, the low pressure refrigerant pipe 50, and the high pressure refrigerant pipe 40. The second switching valve 20 is connected to the compressor 12, the outdoor heat exchanger 14, and the low pressure refrigerant pipe 50.

The outdoor unit 10 further includes an outdoor blowing fan 16 which is disposed adjacent to the outdoor heat exchanger 14, and forms a flow of air around the outdoor heat exchanger 14. The outdoor heat exchanger 14 is connected to the liquid pipe 30 and transfers the liquid refrigerant heat-exchanged in the outdoor heat exchanger 14 to the ventilation device 100. The outdoor heat exchanger 14 may receive the liquid refrigerant heat-exchanged in the ventilation device 100 through the liquid pipe 30. The outdoor unit 10 includes an outdoor unit expansion valve 22 which is disposed in the liquid pipe 30 and expands the refrigerant flowing inside the liquid pipe 30.

The outdoor unit 10 is connected to the ventilation device 100 by the liquid pipe 30, the high pressure refrigerant pipe 40, and the low pressure refrigerant pipe 50. The liquid pipe 30 connects the outdoor heat exchanger 14 and the refrigerant distributor 150 of the ventilation device 100. The high-pressure refrigerant pipe 40 connects the first switching valve 18 and the refrigerant distributor 150. The low pressure refrigerant pipe 50 connects the second switching valve 20 or the compressor 12 and the refrigerant distributor 150.

Operation

Hereinafter, a flow of refrigerant and a flow of air according to a cooling operation and a heating operation of the air conditioner will be described with reference to FIGS. 5A to 6B.

The air conditioner of the present disclosure may perform a cooling operation for discharging cooled air to an indoor space or a heating operation for discharging heated air to an indoor space. The cooling operation and the heating operation may be determined based on the first main heat exchanger 200a and the second main heat exchanger 200b disposed inside the ventilation device 100.

The air conditioner of the present disclosure may perform a dehumidifying operation for discharging dry air into an indoor space. The dehumidifying operation may be performed by adjusting the opening amount of the liquid pipe control valve 32 and adjusting the amount of refrigerant flowing into the liquid pipe 30. In addition, the dehumidifying operation can be performed by adjusting the liquid pipe control valve 32 during the cooling operation.

When the air conditioner is in the cooling operation or a heating operation, the first blowing fan 140 and the second blowing fan 144 are operated. When the air conditioner is in the cooling operation or a heating operation, the total heat exchanger 130 operates and the heat exchanger 132 rotates, thereby achieving a heat exchange between the air flowing through the supply flow path 120 and the air flowing through the discharge flow path 122.

Figure 6A:
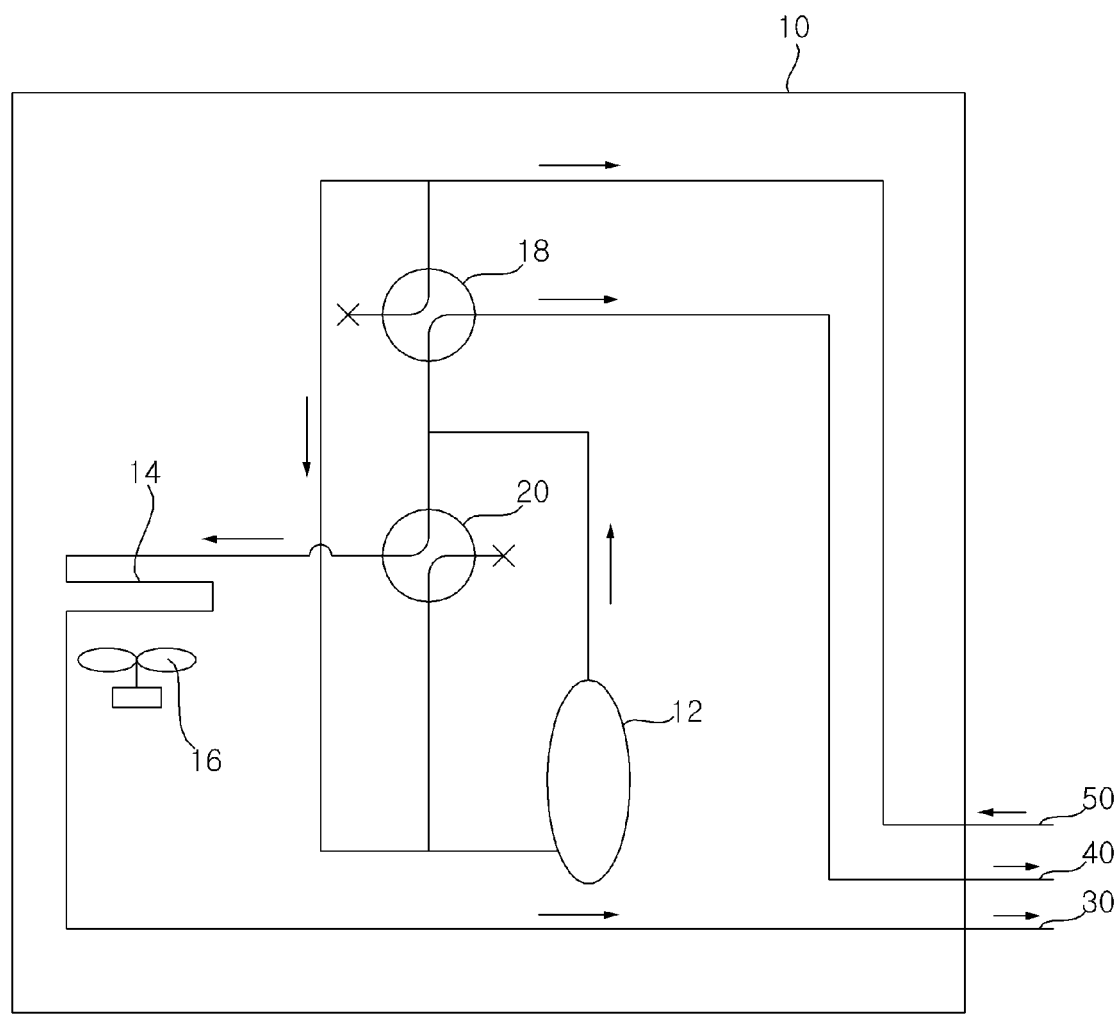
FIGS. 6A and 6B are schematic diagrams illustrating an internal configuration of an outdoor unit according to an embodiment of the present disclosure.

Referring to FIG. 6A, when the air conditioner is in the cooling operation, the refrigerant discharged from the compressor 12 flows into the high pressure refrigerant pipe 40 through the first switching valve 18. In addition, the refrigerant discharged from the compressor 12 flows to the outdoor heat exchanger 14 through the second switching valve 20. The refrigerant passed through the outdoor heat exchanger 14 flows into the liquid pipe 30. In addition, the refrigerant supplied from the ventilation device 100 through the low pressure refrigerant pipe 50 flows to the compressor 12.

Figure 6B:
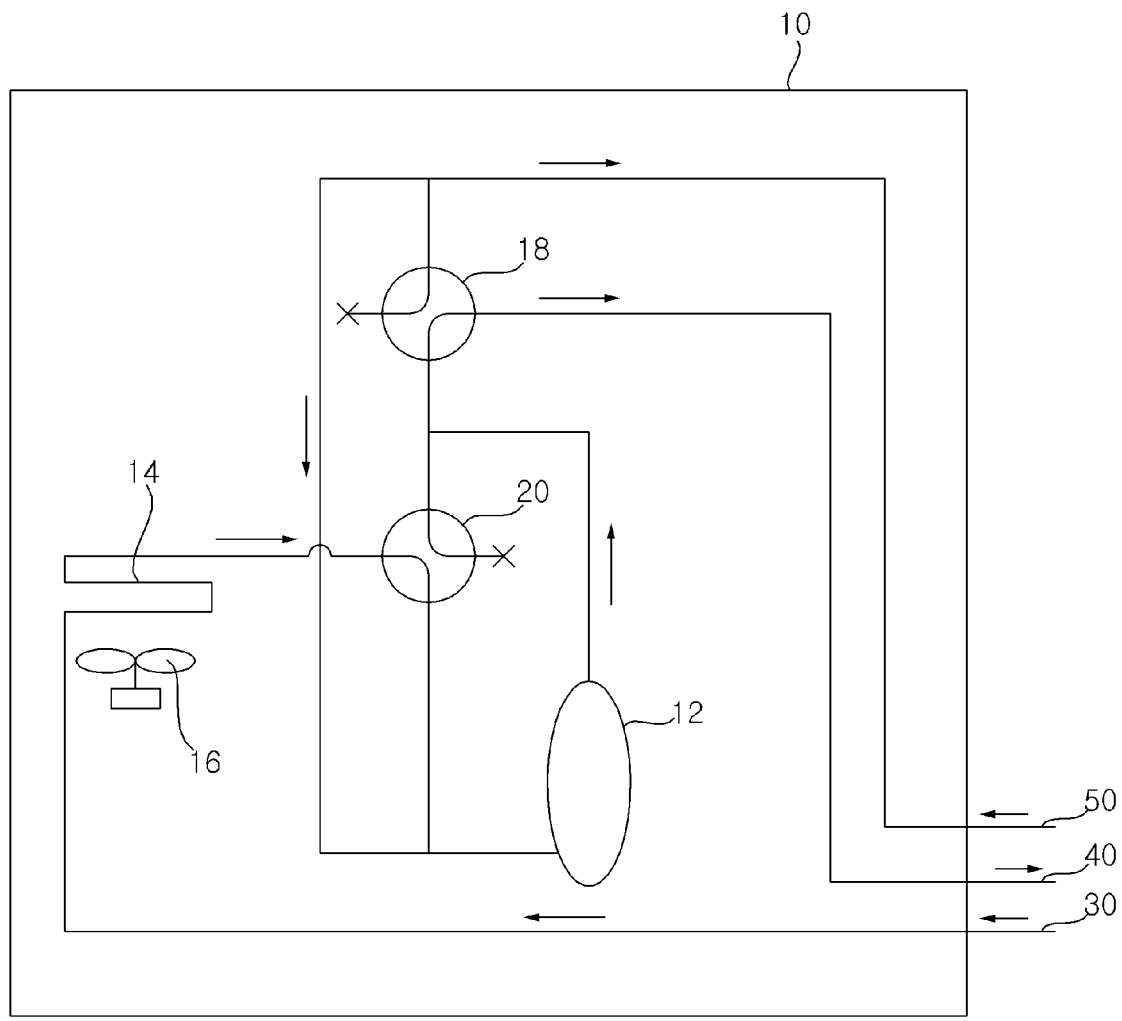

Referring to FIG. 6B, when the air conditioner is in the heating operation, the refrigerant discharged from the compressor 12 flows to the high pressure refrigerant pipe 40 through the first switching valve 18. The refrigerant supplied from the ventilation device 100 through the low pressure refrigerant pipe 50 flows to the compressor 12. In addition, the refrigerant supplied from the ventilation device 100 through the liquid pipe 30 flows to the outdoor heat exchanger 14 and is supplied to the compressor 12 through the second switching valve 20.

Figure 5A:
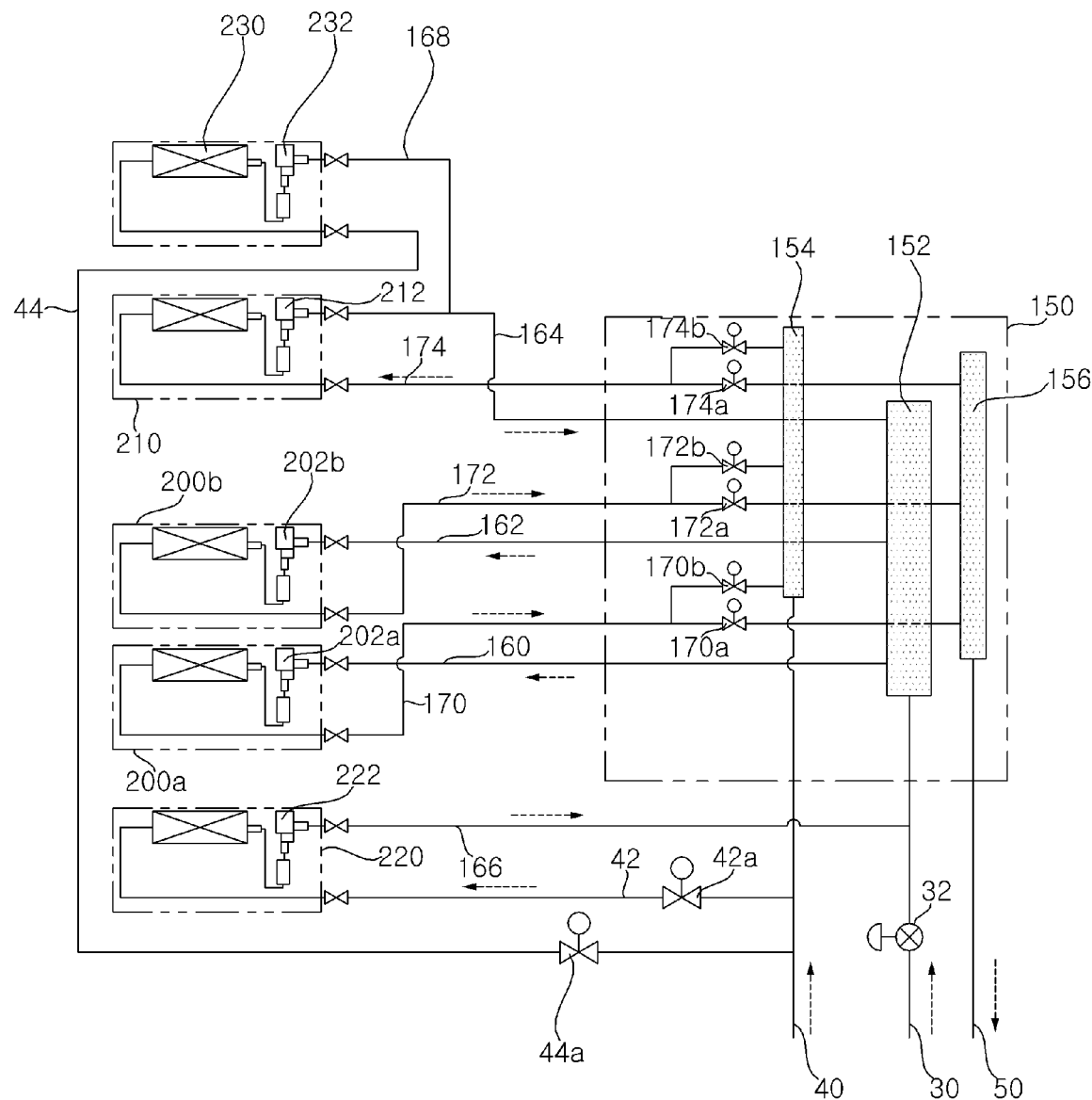
FIG. 5A is a diagram illustrating a flow of a refrigerant when a cooling operation is performed in the system diagram of FIG. 4.

Referring to FIG. 5A, when the air conditioner is in the cooling operation, the first main heat exchanger 200a and the second main heat exchanger 200b are connected to the liquid refrigerant header 152 and the low pressure refrigerant header 156, respectively. When the air conditioner is in the cooling operation, the recovery heat exchanger 210 is connected to the high pressure refrigerant header 154 and the liquid refrigerant header 152, respectively.

Each of the re-heat heat exchanger 220 and the preheat heat exchanger 230 is connected to the high-pressure refrigerant pipe 40, and the flow of the refrigerant is not changed according to the cooling operation or the heating operation. However, the on/off valve 44a disposed in the second branch refrigerant pipe 44 may be opened or closed according to the cooling operation or the heating operation of the air conditioner.

Referring to FIG. 5A, when the air conditioner is in the cooling operation, the on/off valve 44a disposed in the second branch refrigerant pipe 44 is closed. That is, when the air conditioner is in the cooling operation, in the preheat heat exchanger 230, the on-off valve 44a disposed in the second branch refrigerant pipe 44 is closed, so that the refrigerant does not flow.

Referring to FIG. 5A, when the air conditioner is in the cooling operation, a high-pressure gaseous refrigerant flowing through the high-pressure refrigerant pipe 40 may flow to the re-heat heat exchanger 220 through the first branch refrigerant pipe 42. The refrigerant that passed through the re-heat heat exchanger 220 may flow along the first convergence liquid pipe 166, flow to a first indoor liquid pipe 160, and flow to the first main heat exchanger 200a.

When the air conditioner is in the cooling operation, the first main heat exchanger 200a and the second main heat exchanger 200b cool the air flowing in the supply flow path 120. When the air conditioner is in the cooling operation, the recovery heat exchanger 210 heats the air flowing in the discharge flow path 122. When the air conditioner is in the cooling operation, the re-heat heat exchanger 220 may heat the air flowing in the supply flow path 120.

When the air conditioner is in the cooling operation, the air flowing through the supply flow path 120 is exchanged with indoor air through the total heat exchanger 130. When the air conditioner is in the cooling operation, air flowing through the supply flow path 120 may be cooled primarily by exchanging heat with cold air flowing through the discharge flow path 122.

When the air conditioner is in the cooling operation, the air passed through the total heat exchanger 130 and flowing through the supply flow path 120 passes through the first main heat exchanger 200a and the second main heat exchanger 200b, and is cooled. At this time, condensed water may be generated from the cooled air. When the air conditioner is in the cooling operation, the flowing air that passed through the first main heat exchanger 200a and the second main heat exchanger 200b may be dried by passing through the re-heat heat exchanger 220. The re-heat heat exchanger 220 has a size smaller than that of the first main heat exchanger 200a or the second main heat exchanger 200b. Since the re-heat heat exchanger 220 has a smaller amount of heat exchange than the first main heat exchanger 200a or the second main heat exchanger 200b, the air discharged to the outside air supply port 118 may be a cooled and dried air. Accordingly, when the air conditioner is in the cooling operation, the ventilation device 100 may supply cooled and dried air to the indoor space.

When the air conditioner is in the cooling operation, the air flowing through the discharge flow path 122 is exchanged with the outside air through the total heat exchanger 130. When the air conditioner is in the cooling operation, the air flowing through the discharge flow path 122 may pass through the recovery heat exchanger 210 and be heated.

When the air conditioner is in the cooling operation, the refrigerant discharged from the compressor 12 may be supplied to the high pressure refrigerant pipe 40 through the first switching valve 18, and may be supplied to the outdoor heat exchanger 14 through the second switching valve 20.

Figure 5B:
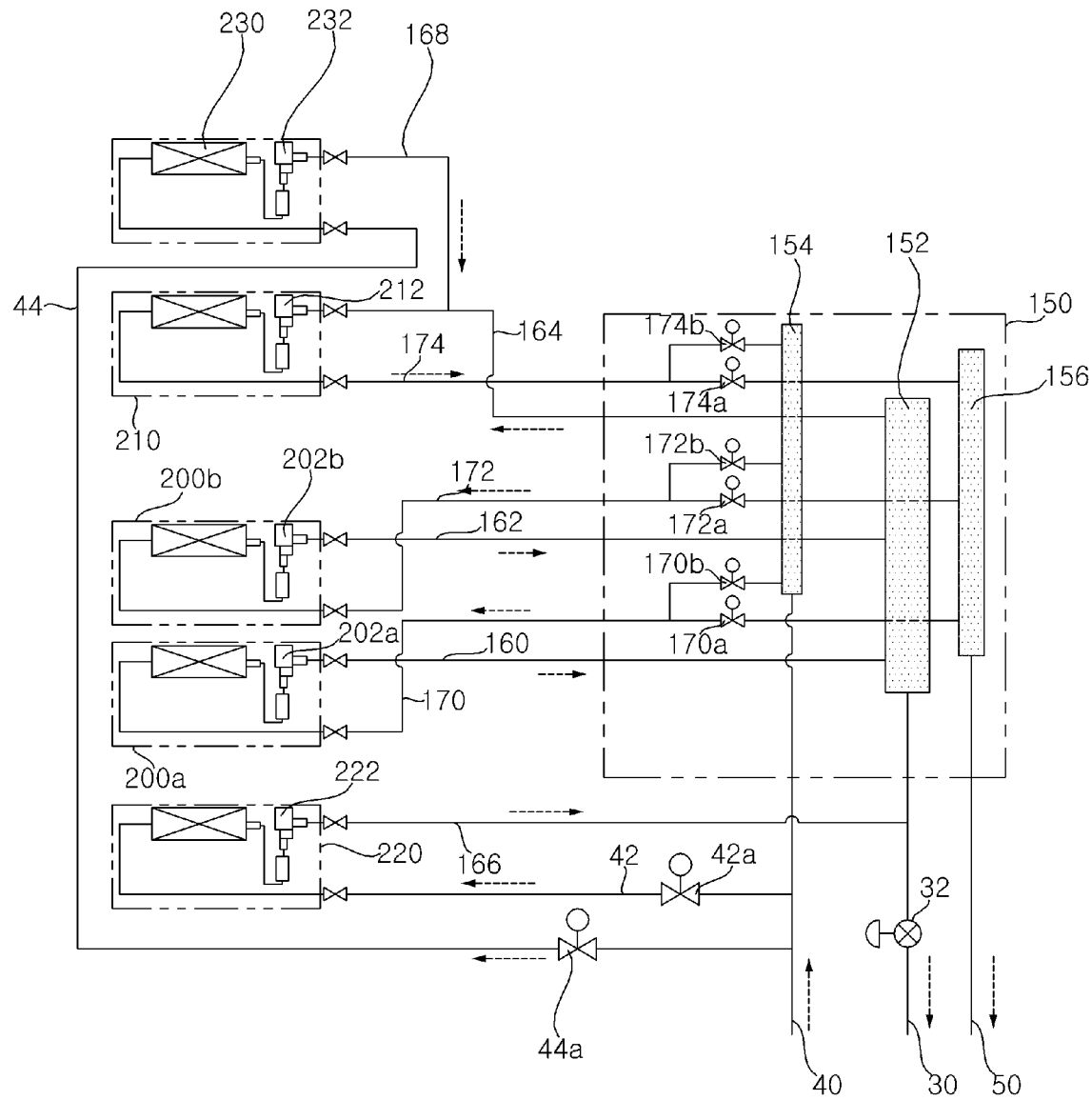
FIG. 5B is a diagram illustrating a flow of a refrigerant when a heating operation is performed in the system diagram of FIG. 4.

Referring to FIG. 5B, when the air conditioner is in the heating operation, the first main heat exchanger 200a and the second main heat exchanger 200b are connected to the high pressure refrigerant header 154 and the liquid refrigerant header 152, respectively. When the air conditioner is in the heating operation, the recovery heat exchanger 210 is connected to the liquid refrigerant header 152 and the low pressure refrigerant header 156, respectively.

When the air conditioner is in the heating operation, the on/off valve 44a disposed in the second branch refrigerant pipe 44 is opened. That is, when the air conditioner is in the heating operation, the high-pressure gaseous refrigerant flowing through the high-pressure refrigerant pipe 40 flows to the re-heat heat exchanger 220 and the preheat heat exchanger 230, respectively.

Referring to FIG. 5B, when the air conditioner is in the heating operation, the control valve 42a is opened, so that the high-pressure gaseous refrigerant flowing through the high-pressure refrigerant pipe 40 may flow to the re-heat heat exchanger 220 through the first branch refrigerant pipe 42. The refrigerant that passed through the re-heat heat exchanger 220 may flow along the first convergence liquid pipe 166, flow to the first indoor liquid pipe 160, and flow to the first main heat exchanger 200a.

Referring to FIG. 5B, when the air conditioner is in the heating operation, the on-off valve 44a is opened, so that the high-pressure gaseous refrigerant flowing through the high-pressure refrigerant pipe 40 may flow to the preheat heat exchanger 230 through the second branch refrigerant pipe 44. The refrigerant that passed through the preheat heat exchanger 230 may flow along the second convergence liquid pipe 168, flow to the third indoor liquid pipe 164, and flow to the recovery heat exchanger 200.

When the air conditioner is in the heating operation, the first main heat exchanger 200a and the second main heat exchanger 200b heat the air flowing in the supply flow path 120. When the air conditioner is in the heating operation, the recovery heat exchanger 210 cools the air flowing in the discharge flow path 122. When the air conditioner is in the heating operation, the re-heat heat exchanger 220 and the preheat heat exchanger 230 may heat the air flowing in the supply flow path 120.

When the air conditioner is in the heating operation, the air flowing through the supply flow path 120 is primarily heated by the preheat heat exchanger 230 disposed in the inlet end of the supply flow path 120.

When the air conditioner is in the heating operation, the air that passed through the preheat heat exchanger 230 is heat-exchanged with the indoor air through the total heat exchanger 130. When the air conditioner is in the heating operation, the air flowing through the supply flow path 120 may be heat-exchanged with the warm air flowing through the discharge flow path 122, and secondarily heated.

When the air conditioner is in the heating operation, the air passing through the total heat exchanger 130 and flowing through the supply flow path 120 is heated by passing through the first main heat exchanger 200a and the second main heat exchanger 200b. When the air conditioner is in the heating operation, the air flowing through the first main heat exchanger 200a and the second main heat exchanger 200b may be heated by passing through the re-heat heat exchanger 220.

When the air conditioner is in the heating operation, the air flowing through the discharge flow path 122 is heat-exchanged with the outside air through the total heat exchanger 130. When the air conditioner is in the heating operation, the air flowing through the discharge flow path 122 may be cooled by passing through the recovery heat exchanger 210.

When the air conditioner is in the heating operation, the refrigerant discharged from the compressor 12 is supplied to the high-pressure refrigerant pipe 40 through the first switching valve 18.

When the air conditioner is in a dehumidifying operation, the first blowing fan 140 and the second blowing fan 144 operate. When the air conditioner is in the cooling operation or the heating operation, the total heat exchanger 130 operates and the heat exchanger 132 rotates, thereby achieving a heat exchange between the air flowing through the supply flow path 120 and the air flowing through the discharge flow path 122.

When the air conditioner is in the dehumidifying operation, like the cooling operation, the first main heat exchanger 200a and the second main heat exchanger 200b are connected to each of the liquid refrigerant header 152 and the low pressure refrigerant header 156, and the recovery heat exchanger 210 is connected to each of the high pressure refrigerant header 154 and the liquid refrigerant header 152.

The re-heat heat exchanger 220 receives a refrigerant from the high-pressure refrigerant pipe 40. However, in the preheat heat exchanger 230, the on-off valve 44a is closed, so that the refrigerant does not flow from the high-pressure refrigerant pipe 40.

When the air conditioner is in the dehumidifying operation, a high-pressure gaseous refrigerant flowing through the high-pressure refrigerant pipe 40 may flow to the re-heat heat exchanger 220 through the first branch refrigerant pipe 42. The refrigerant that passed through the re-heat heat exchanger 220 may flow along the first convergence liquid pipe 166, flow to the first indoor liquid pipe 160, and flow to the first main heat exchanger 200a.

When the air conditioner is in the dehumidifying operation, the liquid pipe control valve 32 reduces the amount of refrigerant flowing to the liquid pipe 30, thereby increasing the amount of refrigerant flowing to the re-heat heat exchanger 220 through the first branch refrigerant pipe 42.

According to the air conditioner of the present disclosure, one or more of the following effects are provided.

First, it is possible to control the temperature of the air supplied to the indoor without adding a separate auxiliary heat source, by disposing a plurality of heat exchangers through which refrigerant flows through a single compressor in the indoor unit that ventilates the indoor air and the outside air, thereby minimizing power consumption.

Second, since a plurality of heat exchangers disposed in the indoor unit is connected to a refrigerant distributor, each of the plurality of heat exchangers can be simultaneously used as an evaporator or a condenser, thereby maximizing heat exchange efficiency due to the driving of a single compressor.

Third, the re-heat heat exchanger is disposed in downstream of the main heat exchanger to control the temperature and humidity of the air discharged into the indoor in detail, thereby providing comfortable air to a user in the indoor space.

Fourth, the air cooled through the main heat exchanger can be heated in a high temperature range even in a small area, by adjusting the amount of refrigerant supplied to the re-heat heat exchanger.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   an outdoor unit including a compressor configured to compress a refrigerant and an outdoor heat exchanger configured to exchange heat between the refrigerant and outside air; and
   a ventilation device connected to the outdoor unit through a liquid refrigerant pipe, a high-pressure refrigerant pipe, and a low-pressure refrigerant pipe, and configured to supply the outside air to an indoor space, and discharge indoor air to an outside,
   wherein the ventilation device comprises:
   a case defining a supply flow path through which the outside air is supplied to the indoor space, and a discharge flow path through which the indoor air is discharged to the outside;
   a main heat exchanger disposed in the supply flow path, and configured to exchange heat between air flowing in the supply flow path and the refrigerant;

a recovery heat exchanger disposed in the discharge flow path, and configured to exchange heat between air flowing in the discharge flow path and the refrigerant;

a refrigerant distributor connected to the liquid refrigerant pipe, the high-pressure refrigerant pipe, and the low-pressure refrigerant pipe, the refrigerant distributor being configured to supply the refrigerant from the outdoor unit to each of the main heat exchanger and the recovery heat exchanger, and discharge the refrigerant from each of the main heat exchanger and the recovery heat exchanger to the outdoor unit;

a re-heat heat exchanger disposed in the supply flow path and configured to heat air flowing through the supply flow path, the re-heat heat exchanger being connected to each of the high-pressure refrigerant pipe and the liquid refrigerant pipe, wherein a liquid pipe control valve is disposed in the liquid refrigerant pipe and configured to control an amount of refrigerant supplied from the outdoor unit to the refrigerant distributor, and wherein the re-heat heat exchanger is connected to the liquid refrigerant pipe at a position between the refrigerant distributor and the liquid pipe control valve.

2. The air conditioner of claim 1, wherein the re-heat heat exchanger is disposed downstream of the main heat exchanger in the supply flow path.

3. The air conditioner of claim 1, wherein the re-heat heat exchanger has a smaller heat exchange area than the main heat exchanger.

4. The air conditioner of claim 1, further comprising a controller configured to control the liquid pipe control valve to increase an amount of the refrigerant supplied to the re-heat heat exchanger during a dehumidifying operation performed to discharge dry air into the indoor space through the supply flow path.

5. The air conditioner of claim 1, further comprising:
a first branch refrigerant pipe connecting the high-pressure refrigerant pipe and the re-heat heat exchanger; and
a first convergence refrigerant pipe connecting the re-heat heat exchanger and the refrigerant distributor.

6. The air conditioner of claim 1, wherein the refrigerant distributor comprises:
a liquid refrigerant header connecting the liquid refrigerant pipe and each of the main heat exchanger and the recovery heat exchanger disposed inside the case;

a high-pressure refrigerant header connecting the high-pressure refrigerant pipe and each of the main heat exchanger and the recovery heat exchanger disposed inside the case; and a low pressure refrigerant header connecting the low pressure refrigerant pipe and each of the main heat exchanger and the recovery heat exchanger disposed inside the case.

7. The air conditioner of claim 1, further comprising a control valve configured to adjust an amount of refrigerant supplied from the high-pressure refrigerant pipe to the re-heat heat exchanger.

8. The air conditioner of claim 1, further comprising a preheat heat exchanger disposed in the supply flow path and connected to the high-pressure refrigerant pipe, the preheat heat exchanger being configured to heat air flowing through the supply flow path.

9. The air conditioner of claim 5, wherein the first convergence refrigerant pipe is connected to the liquid refrigerant pipe to supply the refrigerant discharged from the re-heat heat exchanger to the refrigerant distributor.

10. The air conditioner of claim 9, wherein the refrigerant distributor comprises a liquid refrigerant header connecting the liquid refrigerant pipe and each of the main heat exchanger and the recovery heat exchanger disposed inside the case, wherein the first convergence refrigerant pipe is connected to the liquid refrigerant pipe in a position adjacent to the liquid refrigerant header and between the liquid refrigerant header and the liquid pipe control valve.

11. The air conditioner of claim 8, further comprising an on/off valve configured for enabling or preventing the supply of the refrigerant from the high-pressure refrigerant pipe to the preheat heat exchanger.

12. The air conditioner of claim 8, wherein the ventilation device includes a total heat exchanger in communication with the supply path and the discharge flow path, wherein the re-heat exchanger is located downstream from the total heat exchanger in the supply flow path, wherein the recovery heat exchanger is located downstream from the total heat exchanger in the discharge flow path, and wherein the preheat exchanger is located upstream of the total heat exchanger in the supply flow path.

13. The air conditioner of claim 11, further comprising a controller configured to control the on/off valve to stop supply of the refrigerant to the preheat heat exchanger during a dehumidifying operation performed to discharge dry air to an indoor space through the supply flow path.

* * * * *